United States Patent
Thibaut et al.

(10) Patent No.: US 12,406,228 B2
(45) Date of Patent: Sep. 2, 2025

(54) METHODS AND AUTONOMOUS ROBOTS FOR TAKING INVENTORY IN A STRUCTURE

(71) Applicant: OVH, Roubaix (FR)

(72) Inventors: Christophe Maurice Thibaut, Noyelles les Seclin (FR); Nassima Medjenah, Roubaix (FR); Dorian Ibert, Roubaix (FR); Karl Bogaert, Roubaix (FR)

(73) Assignee: OVH, Roubaix (FR)

( * ) Notice: Subject to any disclaimer, the term of this patent is extended or adjusted under 35 U.S.C. 154(b) by 256 days.

(21) Appl. No.: 18/238,318

(22) Filed: Aug. 25, 2023

(65) Prior Publication Data

US 2024/0070611 A1 Feb. 29, 2024

(30) Foreign Application Priority Data

Aug. 30, 2022 (EP) .................................... 22306282

(51) Int. Cl.
*G06Q 10/087* (2023.01)
*G05D 1/00* (2024.01)
(Continued)

(52) U.S. Cl.
CPC ......... *G06Q 10/087* (2013.01); *G05D 1/0246* (2013.01); *G06T 7/73* (2017.01); *H04N 23/90* (2023.01)

(58) Field of Classification Search
CPC ............... G06Q 10/087; G05D 1/0246; G05D 2105/93; G05D 2107/70; G06T 7/70; G06K 19/06028
See application file for complete search history.

(56) References Cited

U.S. PATENT DOCUMENTS

| 7,108,188 B2 * | 9/2006 | Hoshino ............ G11B 15/6885 |
| 7,693,757 B2 | 4/2010 | Zimmerman |

(Continued)

FOREIGN PATENT DOCUMENTS

| EP | 4012531 A1 | 6/2022 |
| JP | 6912946 B2 | 8/2021 |

OTHER PUBLICATIONS

European Search Report with regard to the EP Patent Application No. 22306282.9 completed Jan. 20, 2023.

*Primary Examiner* — A. Hunter Wilder
(74) *Attorney, Agent, or Firm* — BCF LLP

(57) ABSTRACT

System and method for taking inventory of a plurality of objects within a structure. The method is executed by a controller of an autonomous mobile robot and comprises causing the said robot to navigate through at least a portion of the structure, causing at least one camera of the robot to acquire a plurality of positioning images at a first resolution and determining that at least one positioning image contains an image of a predetermined landmark. In response to determining that the at least one positioning image contains the image of the predetermined landmark, the autonomous mobile robot navigates to a predetermined data collection position, the at least one camera of the autonomous mobile robot acquires at least one inventory image at a second resolution, the second image resolution being greater than the first resolution, and a plurality of inventory labels are extracted from the at least one inventory image.

13 Claims, 11 Drawing Sheets

(51) Int. Cl.
   *G06T 7/73*      (2017.01)
   *H04N 23/90*     (2023.01)

(56) References Cited

U.S. PATENT DOCUMENTS

| | | | |
|---|---|---|---|
| 7,725,212 | B2 | 5/2010 | Prasee |
| 8,117,092 | B2 | 2/2012 | Farkas et al. |
| 9,152,149 | B1 | 10/2015 | Palamarchuk et al. |
| 9,176,648 | B1 | 11/2015 | Laporte et al. |
| 9,378,481 | B2* | 6/2016 | Hastman ............... G06Q 10/087 |
| 9,463,574 | B2 | 10/2016 | Purkayastha et al. |
| 9,908,239 | B1 | 3/2018 | Obrien et al. |
| 10,071,856 | B2 | 9/2018 | Hance et al. |
| 10,210,603 | B2* | 2/2019 | Venable .................... G06T 3/14 |
| 10,331,876 | B2 | 6/2019 | Helsel et al. |
| 10,353,395 | B2 | 7/2019 | Hance et al. |
| 10,467,587 | B2 | 11/2019 | Bogolea et al. |
| 10,565,548 | B2 | 2/2020 | Skaff et al. |
| 10,769,582 | B2 | 9/2020 | Williams et al. |
| 10,935,980 | B2* | 3/2021 | Mukherjee ........... H05K 7/1498 |
| 11,334,086 | B2* | 5/2022 | Wang .................. G05D 1/0274 |
| 2005/0113978 | A1* | 5/2005 | Sharma ................ G05D 1/0282 |
| | | | 700/259 |
| 2013/0231779 | A1* | 9/2013 | Purkayastha .......... B25J 9/1697 |
| | | | 700/258 |
| 2017/0225891 | A1* | 8/2017 | Elazary ................ G05D 1/0234 |
| 2018/0005176 | A1* | 1/2018 | Williams ............. G06Q 10/087 |
| 2018/0364333 | A1* | 12/2018 | Jungwirth ............. G01S 7/4817 |
| 2019/0180150 | A1 | 6/2019 | Taylor et al. |
| 2021/0221612 | A1 | 7/2021 | Rogers et al. |
| 2022/0051179 | A1 | 2/2022 | Savvides et al. |
| 2022/0051442 | A1 | 2/2022 | Coomes et al. |
| 2022/0187844 | A1* | 6/2022 | Reichenbach ....... G05D 1/0274 |

\* cited by examiner

METHODS AND AUTONOMOUS ROBOTS FOR TAKING INVENTORY IN A STRUCTURE

CROSS REFERENCE

The present application claims priority to EP Application No. 22306282.9, filed Aug. 30, 2022 entitled "Methods and Autonomous Robots for Taking Inventory in a Structure", the entirety of which is incorporated herein by reference.

FIELD OF TECHNOLOGY

The present technology generally relates to methods and autonomous mobile robots for taking inventory in a structure.

BACKGROUND

Data centers provide computing facilities that service operational processing needs of a wide variety of local and global customers. As such, data centers implement a vast number of computer processing systems, i.e., processing servers and associated electronic equipment that, depending on the scale of customers, can range from hundreds to thousands of the same. Typically, for maintenance accessibility reasons, data centers organize the computer processing systems into a series of spaced rows of racks arranged in parallel that are separated by an aisle space disposed in between two consecutive rows of racks.

In addition, the racks may be housed in a space have a large surface area of more than thousands of square meters. Due to such a substantially large size of the data centers, the amount of time and expense to perform daily operations by human operators of the data centers may be considerable. Notably, taking inventory of the computer processing systems contained in a data center is a valuable task for proper management of the data center. In conventional data centers, inventory of physical locations and hardware characteristics of the computer processing systems is manually performed. Besides, said inventory may have to be updated on a regular basis due to potential replacement, modifications of locations and/or addition of new computer processing systems.

Therefore, there exists some interest in an autonomous system that takes inventory of a plurality of objects within a structure such as computer processing systems in a datacenter.

SUMMARY

It is an object of the present technology to ameliorate at least some of the inconveniences present in the prior art.

According to one aspect of the present technology, there is provided a method for taking inventory of a plurality of objects within a structure, the method comprising causing the autonomous mobile robot to navigate through at least a portion of the structure, while navigating through the portion of the structure, causing at least one camera of the autonomous mobile robot to acquire a plurality of positioning images at a first image resolution, determining that at least one positioning image of the plurality of positioning images contains an image of a predetermined landmark, in response to determining that the at least one positioning image of the plurality of positioning images contains the image of the predetermined landmark, causing the autonomous mobile robot to navigate to a predetermined data collection position, the predetermined data collection position being based at least in part on a position of the autonomous mobile robot during acquisition of the at least one positioning image, causing the at least one camera of the autonomous mobile robot to acquire at least one inventory image at a second image resolution, the second image resolution being greater than the first image resolution and extracting, from the at least one inventory image, a plurality of inventory labels, each inventory label relating to a corresponding object of the plurality of objects within the structure.

In some examples of the method, causing the autonomous mobile robot to navigate to the predetermined data collection position comprises causing the robot to come to a stop in an imaging position relative to the predetermined landmark.

In some examples of the method, causing the autonomous mobile robot to navigate through at least the portion of the structure comprises accessing a plan of the structure and causing the autonomous mobile robot to displace through the structure, displacements of the autonomous mobile robot being based at least in part on the plan of the structure.

In some examples of the method, causing the autonomous mobile robot to displace through the structure further comprises acquiring environmental information using at least one sensor of the autonomous mobile robot, displacements of the autonomous mobile robot being based at least in part on the environmental information.

In some examples of the method, determining that the at least one positioning image contains an image of the predetermined landmark comprises determining that the at least one positioning image contains an image of a predetermined repeating landmark.

In some examples of the method, determining that the at least one positioning image contains the image of the predetermined repeating landmark comprises for each of the plurality of positioning images, processing a given image using a form-identifying image treatment algorithm to search for a predetermined repeating form pattern in the given image and in response to successfully finding the predetermined repeating form pattern in the given image, identifying the given image as containing the image of the predetermined repeating landmark.

In some examples of the method, processing the given image using the form-identifying image treatment algorithm comprises identifying a plurality of circular forms of a predetermined color value within the given image and, in response to the plurality of circular forms forming a generally vertical line, identifying the given image as containing the image of the predetermined repeating landmark.

In some examples of the method, causing the at least one camera to acquire the plurality of positioning images at the first image resolution comprises causing a plurality of cameras of the autonomous mobile robot to acquire a plurality of sets of positioning images, the plurality of cameras being configured and arranged to simultaneously image different areas of the structure.

In some examples of the method, causing the at least one camera of the autonomous mobile robot to acquire the plurality of positioning images at the first image resolution and causing the at least one camera to acquire the at least one inventory image at the second image resolution occurs with the at least one camera in a same distance to the plurality of objects.

In some examples of the method, causing the autonomous mobile robot to navigate through the structure comprises causing the autonomous mobile robot to navigate through a datacenter, causing the at least one camera to acquire the plurality of positioning images comprises imaging at least one rack of the datacenter, determining that the at least one positioning image contains the image of the predetermined landmark comprises determining that the at least one positioning image contains an image of a plurality of electronic equipment module lights and extracting each inventory label comprises extracting a plurality of bar codes, each bar code identifying a corresponding electronic equipment module of the at least one rack.

According to another aspect of the present technology, there is provided a non-transitory computer-readable medium comprising computer-readable instructions that, upon being executed by a system, cause the system to perform the method.

According to yet another aspect of the present technology, there is provided an autonomous mobile robot for taking inventory in a structure. The autonomous mobile robot comprises a mobile robot base for providing movement of the autonomous mobile robot, a rigid member connected to and at least partially extending upward from the mobile robot base, at least one camera immovably connected to the rigid member, the at least one camera being configured and arranged to acquire images of a plurality of objects within in the structure and a controller system communicatively connected to the mobile robot base and the at least one camera. The controller system is configured to control displacement of the autonomous mobile robot using the mobile robot base, and control operation of the at least one camera to image surrounding at a first image resolution and a second image resolution, the second image resolution being greater than the first image resolution.

In some examples of the autonomous mobile robot, the at least one camera comprises a plurality of cameras connected to the rigid member and each camera of the plurality of cameras is configured and arranged to simultaneously image a different portion of the structure.

In some examples of the autonomous mobile robot, at least one camera of the plurality of cameras is vertically spaced from at least one other camera of the plurality of cameras.

In some examples of the autonomous mobile robot, the structure is a datacenter and the autonomous robot is configured and arranged for imaging a plurality of racks in the datacenter.

According to yet another aspect of the present technology, there is provided method for taking inventory of a plurality of electronic equipment modules within a datacenter, the method being executed by a controller system of an autonomous mobile robot, the method comprising causing the autonomous mobile robot to navigate through at least a portion of the datacenter, causing at least one camera of the autonomous mobile robot to acquire a plurality of positioning images at a first image resolution, determining that at least one positioning image of the plurality of positioning images contains an image of a predetermined repeating landmark, the predetermined repeating landmark being a generally vertically extending series of electronic equipment module lights, in response to determining that the at least one positioning image of the plurality of positioning images contains the image of the predetermined repeating landmark, causing the autonomous mobile robot to navigate to a predetermined data collection position, the predetermined data collection position being based at least in part on a position of the autonomous mobile robot during acquisition of the at least one positioning image, causing the at least one camera of the autonomous mobile robot to acquire at least one inventory image at a second image resolution, the second image resolution being greater than the first image resolution and extracting, from the at least one inventory image, a plurality of electronic equipment module inventory labels, each electronic equipment module inventory label relating to a corresponding electronic equipment module of a plurality of racks within the datacenter.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
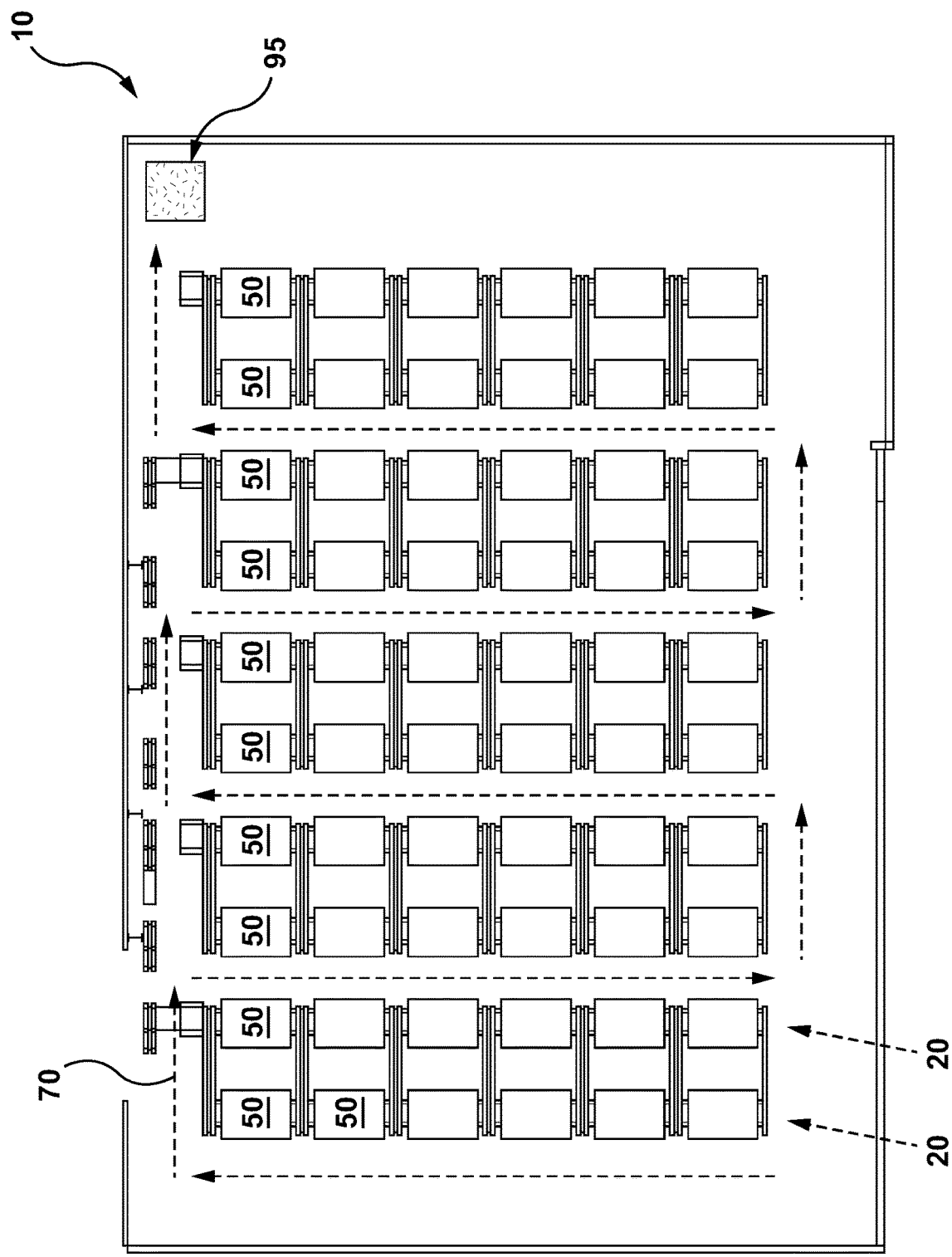
FIG. 1 schematically depicts a datacenter to be observed by the present technology.
Figure 2:
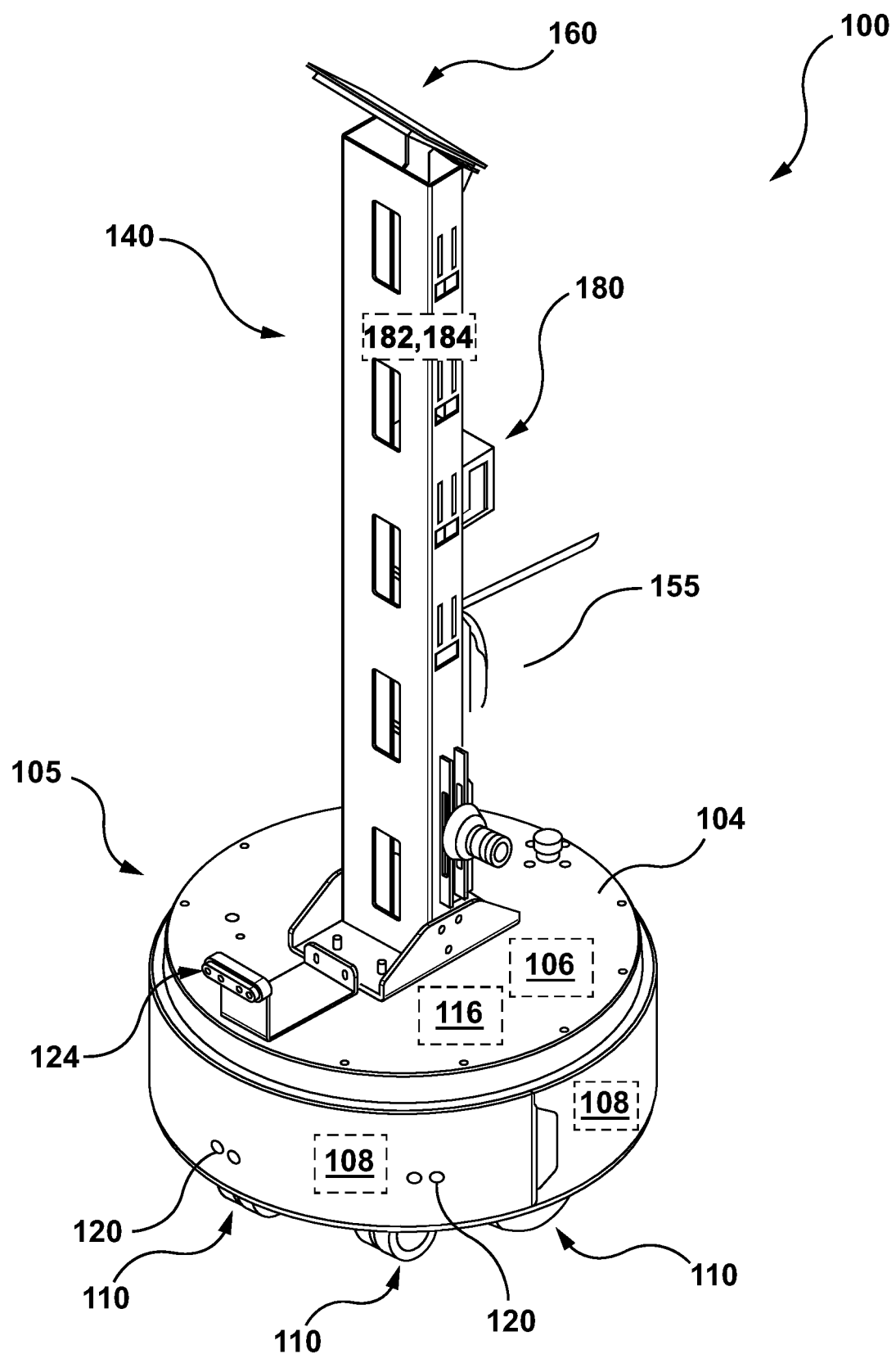
FIG. 2 is a front, left side perspective view of an autonomous mobile robot in accordance with an example of the present technology.
Figure 3:
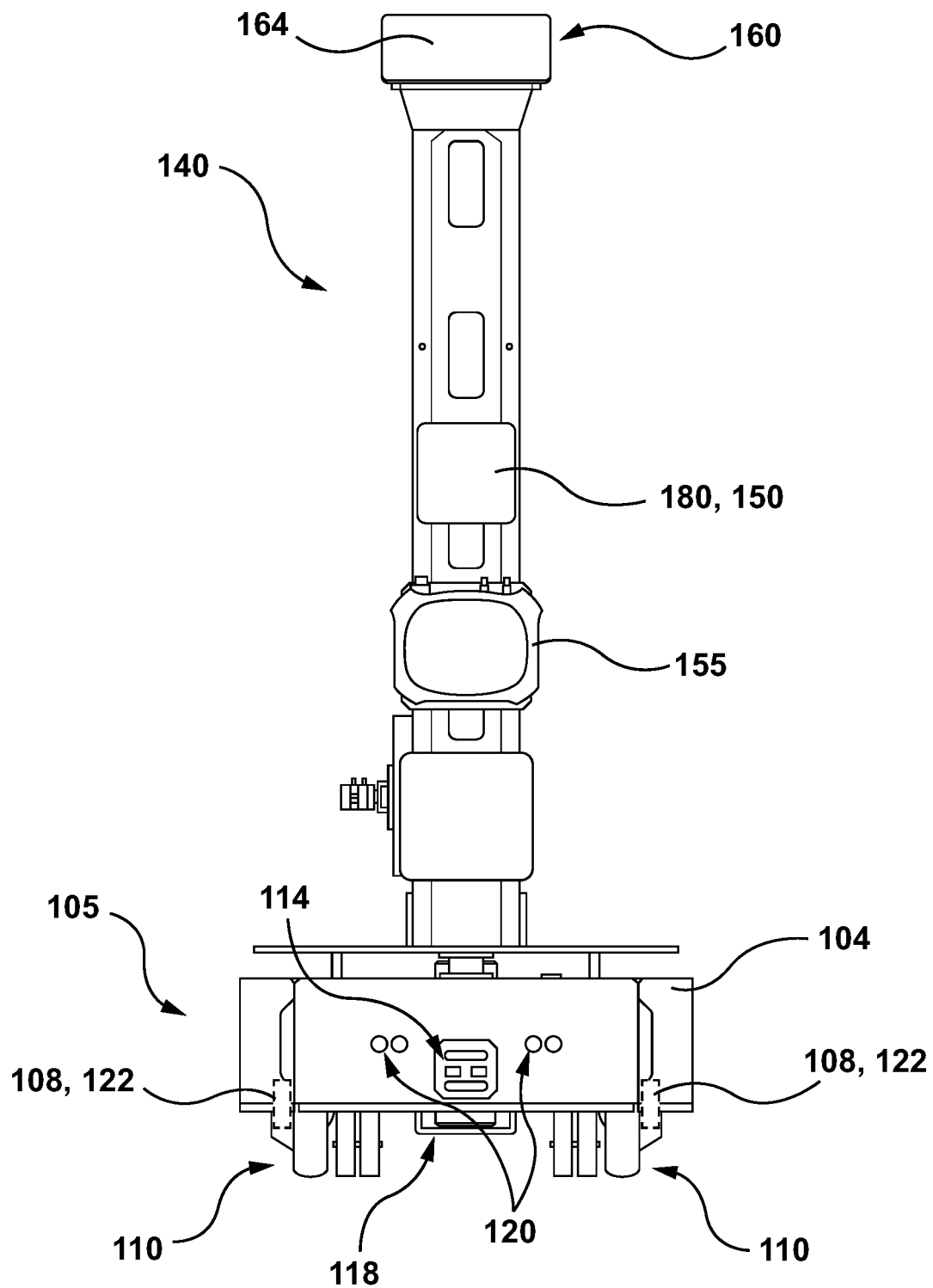
FIG. 3 is a rear side elevation view of the autonomous mobile robot of FIG. 2.
Figure 4:
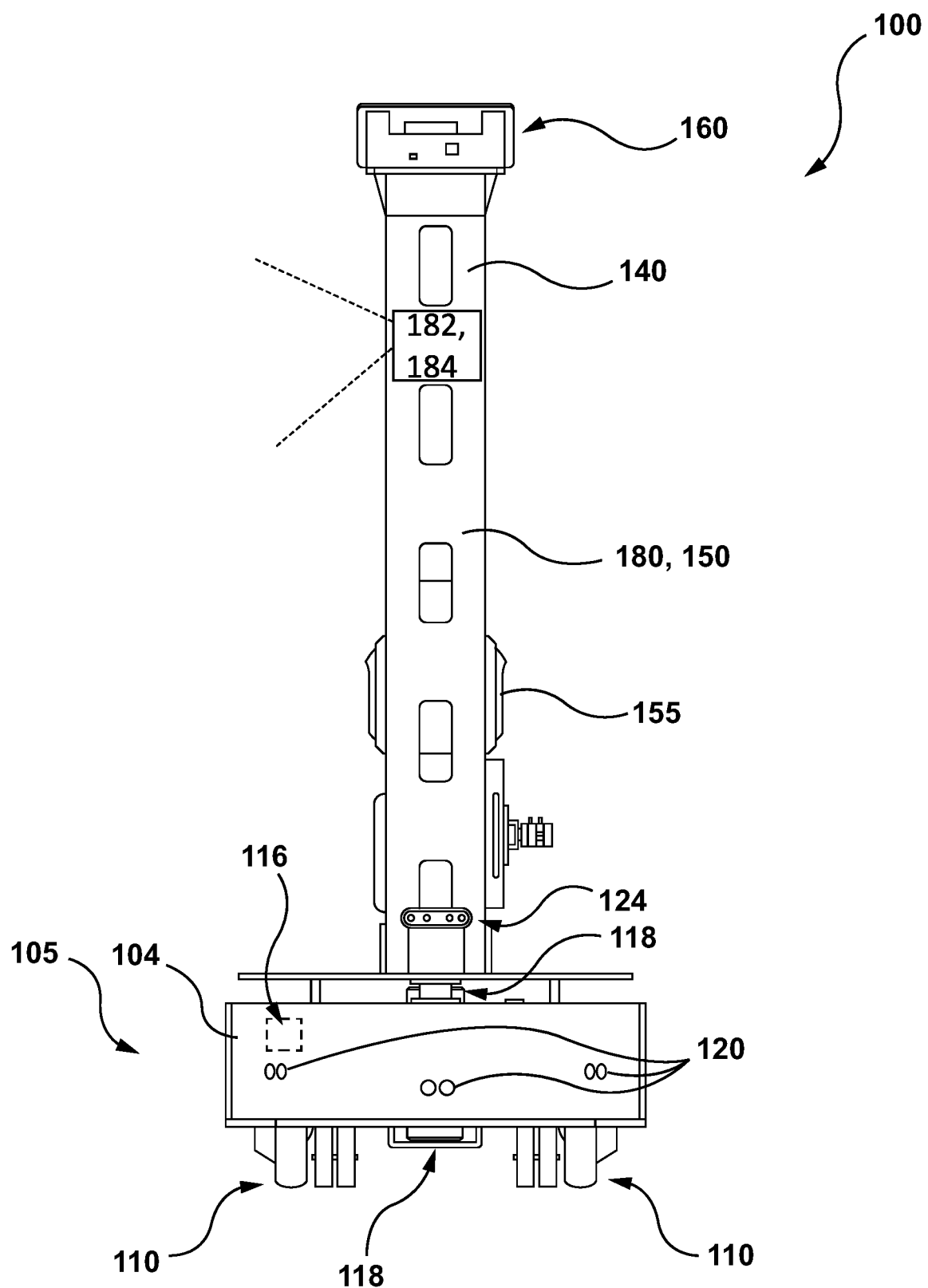
FIG. 4 is a front side elevation view of the autonomous mobile robot of FIG. 2.
Figure 5:
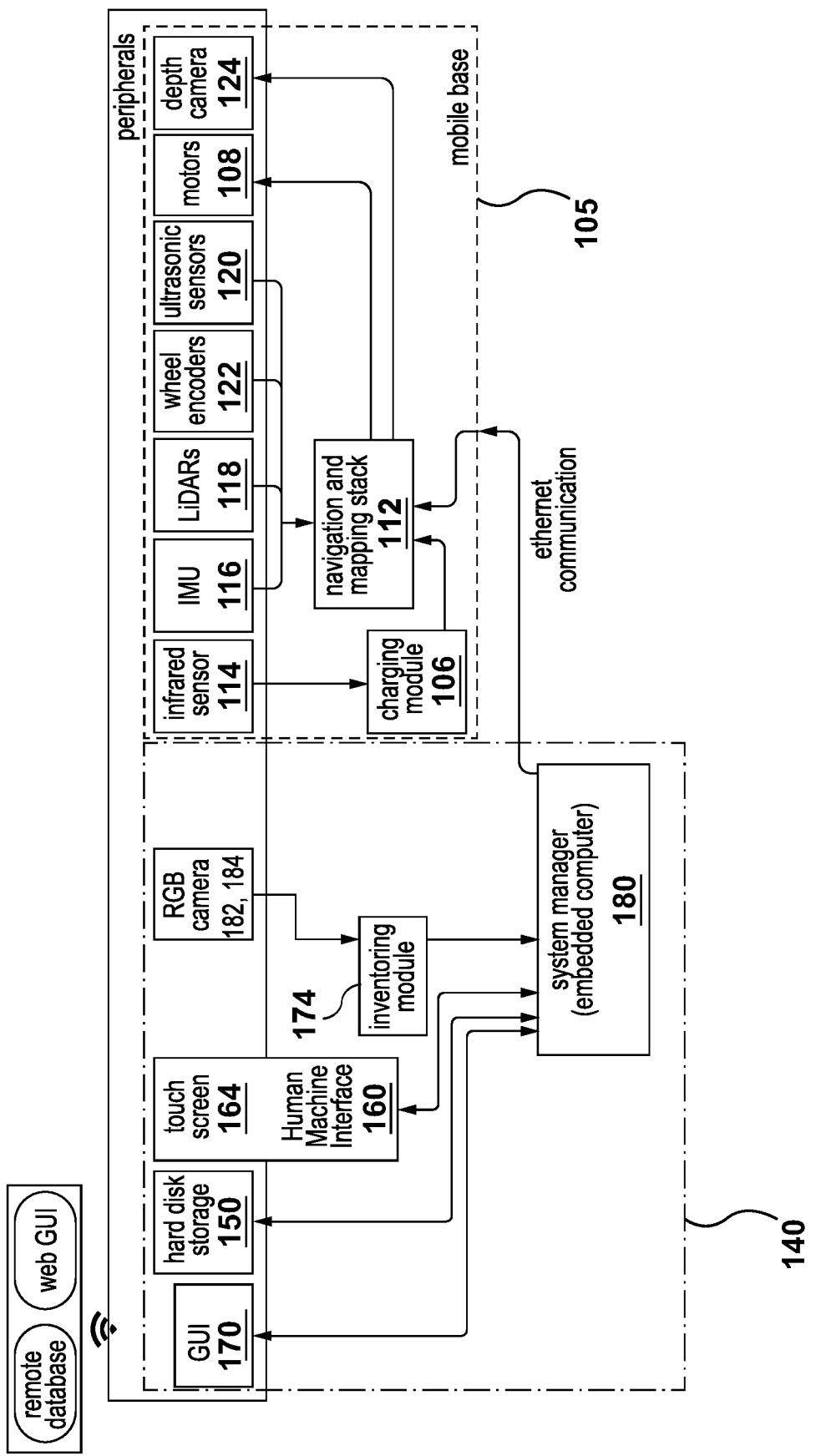
FIG. 5 is a schematic view of components of the autonomous mobile robot of FIG. 2.

Unless otherwise indicated, it should be noted that the figures may not be drawn to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes that may be substantially represented in non-transitory computer-readable media and so executed by a computer or processor, whether or not such computer or processor is explicitly shown.

The functions of the various elements shown in the figures, including any functional block labeled as a "processor" or "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some implementations of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

In the present description, various terms relating to spatial orientation such as "front", "rear", "top", "bottom", "left", "right", "upward", "downward", etc. are described relative forward, up-right motion of the robot of the present technology according to standard operation. However, it is understood that these terms are merely used to improve the clarity of the description and in no way are meant to be limiting in regard to orientation or form thereof.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this soft-ware and hardware may be one server or multiple servers, both of which are included within the expression "at least one server".

In the context of the present specification, "user device" is any computer hardware that is capable of running software appropriate to the relevant task at hand. Thus, some (non-limiting) examples of user devices include personal computers (desktops, laptops, netbooks, etc.), smartphones, and tablets, as well as network equipment such as routers, switches, and gateways. It should be noted that a device acting as a user device in the present context is not precluded from acting as a server to other user devices. The use of the expression "a user device" does not preclude multiple user devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "dataset" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e., its contents), or it could be a unique document descriptor identifying a data object with respect to a particular object storage device, or some other means of directing the recipient of the indication to a network location, memory address, database table, or other location where the data object may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

With these fundamentals in place, we will now consider some non-limiting examples to illustrate various implementations of aspects of the present technology.

An autonomous mobile robot 100 according to the present technology is presented for taking inventory of a plurality of objects within a structure. According to one non-limiting example of the present technology, the autonomous mobile robot 100 (details of which are described below) is configured and arranged for taking inventory of servers within a datacenter 10, illustrated schematically in FIG. 1. Broadly, the datacenter 10 includes a plurality of rows 20 of server racks 50. While ten server rack rows 20 are illustrated with six server racks 50 each, this is simply meant to be a non-limiting example. Each pair of rows 20 is grouped to form a warm alley therebetween, with cold alleys formed between pairs of rows 20. Each server rack 50 supports a plurality of servers (not shown). The cold alleys allow for a robot transport path 70 along which the autonomous mobile robot 100 can travel during operation of methods described hereinbelow. The datacenter 10 further includes a robot charging station 95 for charging the autonomous mobile robot 100. Specifics of the charging station 95 could vary in different examples.

With reference to FIGS. 2 to 5, the autonomous mobile robot 100 according to and performing at least some non-limiting examples of the present technology is illustrated.

The autonomous mobile robot 100, also referred to herein as the autonomous mobile robot 100, includes a mobile robot base 105, also referred to as the base 105, for providing movement of the autonomous mobile robot 100. The base 105 provides a support structure for components of the autonomous mobile robot 100, as well as the movement of the autonomous mobile robot 100. The base 105 includes a main body 104. In the illustrated example, the main body 104 is cylinder, with a diameter greater than its height for stability. It is contemplated that the body 104 could be implemented in different forms.

The base 105 includes a charging module 106 (shown schematically) disposed in the body 104. The charging module 106 includes battery and charging-related electronic components (not separately indicated) for providing power to the components of the autonomous mobile robot 100. The charging module 106 is configured and arranged to connect to the robot charging station 95 to recharge the battery as required.

The robot base 105 also includes electric motors 108 (shown schematically) operatively connected to the charging module 106 and a plurality of ground-engaging elements 110, specifically wheels 110. The wheels 110 are operatively connected to the motors 108 to be driven thereby. The exact number of motors 108 and wheels 110 may vary between different examples and embodiments and it not meant to be limited to the illustrated arrangement.

The robot base 105 includes a navigation and mapping controller 112 communicatively connected to the motors 108 for directing and driving the autonomous mobile robot 100 through the datacenter 10. The robot base 105 further includes a plurality of sensors communicatively connected to the controller 112 to provide navigational and environmental information to the controller 112.

Among the sensors for managing movement of the autonomous mobile robot 100, the base 105 includes an inertial measurement unit (IMU) 116 (shown schematically) communicatively connected to the controller 112 and disposed within the base body 104. In the present example, the IMU 116 is formed from a printed circuit board (PCB), MEMS-based gyroscope and three-axis accelerometer (not separately identified), although the specific implementation of the IMU 116 could vary. The IMU 116 measures acceleration, angular speed, and the orientation of the autonomous mobile robot 100 in space. The IMU 116 generally includes a signal processing circuit communicatively connected to the controller 112 for providing raw or treated spatial or kinetic data to the controller 112.

Figure 6:
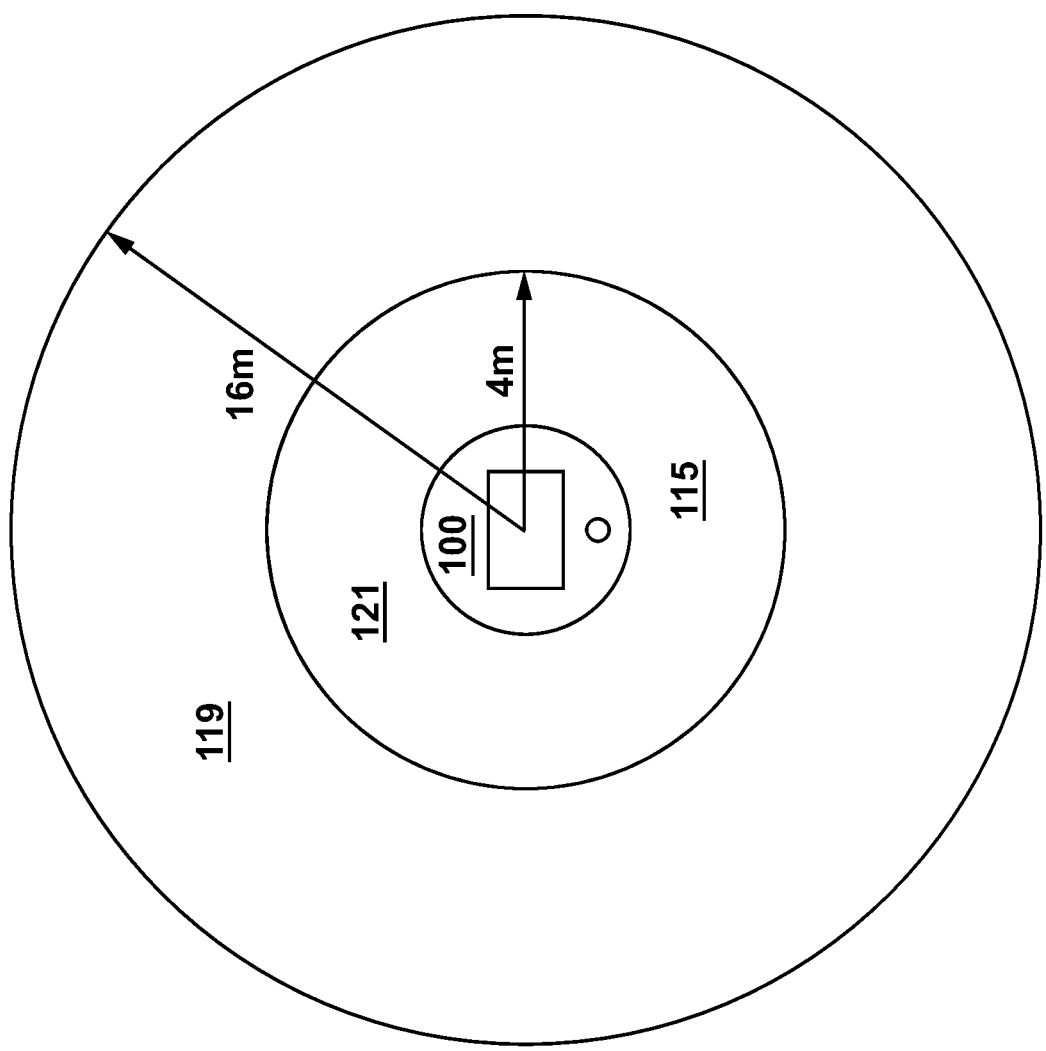
FIG. 6 is a top plan schematic view of the autonomous mobile robot of FIG. 2 and a range of certain sensors of the autonomous mobile robot of FIG. 2.

The base 105 includes two LIDAR assemblies 118 communicatively connected to the controller 112 for detecting objects and obstacles surrounding the autonomous mobile robot 100 in order to map the surroundings for navigation. In the illustrated example, one LIDAR assembly 118 is connected to and disposed in an upper portion of the base body 104 and the other LIDAR assembly 118 is connected to and disposed below the base body 104, but different placement of one or both assemblies 118 are contemplated in different examples. Each LIDAR assembly 118 has an imaging region 119 with a 360° lateral field of view and a range of approximately 16 meters, as is illustrated in FIG. 6. Depending on specific choice of LIDAR assembly, the exact imaging range and/or field of view could vary in different examples.

In addition to the LIDAR assemblies 118, the base 105 also includes five ultrasonic sensors 120 communicatively connected to the controller 112. The ultrasonic sensors 120 are integrated into the exterior walls of the base body 104, with the ultrasonic sensors 120 being arranged to provide a sensing region 121 with a 360° field of view around the autonomous mobile robot 100. As is also illustrated in FIG. 6, the sensing region 121 has a sensing range of approximately 4 meters from the base 105. The ultrasonic sensors 120 thus provide obstacle detection around the autonomous mobile robot 100, although information from the sensors 120 could also be integrated into mapping by the autonomous mobile robot 100. Depending on the example, it is contemplated that the number and capabilities of the ultrasonic sensors 120 could vary.

The base 105 further includes wheel encoders 122 (shown schematically) for measuring movement of the wheels 110 in order to monitor distance traveled by the autonomous mobile robot 100. Each wheel encoder 122 measures the rotations of a corresponding wheel 110, which provide information on both a distance traveled by each wheel 110 (with the wheel radius being known), as well as the relative movement between wheels 110. The wheel encoders 122 are communicatively connected to the controller 112 and disposed in the base body 104. Depending on the example, it is contemplated that the wheel encoders 122 could be omitted in some cases.

The base 105 also includes four infrared sensors 114 communicatively connected to the controller 112, via the charging module 106. The infrared sensors 114 are disposed on a forward side of the base 105 in order to sense a small region in front of the autonomous mobile robot 100 (when moving in a generally forward direction). As is illustrated in FIG. 6, an infrared sensing region 115 extends a short distance generally forward from the infrared sensors 114. The infrared sensors 114 serve to detect the charging base 95, when in close proximity to the base 95, and to properly position the autonomous mobile robot 100 relative to the charging base 95 in order to autonomously connect the autonomous mobile robot 100 to the charging base 95 for charging. In at least some examples, the infrared sensors 114 could be omitted, disposed on a backward side of the base 105 in order to sense a small region behind the autonomous mobile robot 100 (when moving in a generally forward direction) or exchanged for different sensing technology for positioning the robot 110 relative to the charging base 95.

The base 105 further includes a camera 124, also referred to as a depth camera 124, disposed on a top surface of the base body 104. As will be described further below, the camera 124 provides a live and/or recorded view from a front side of the autonomous mobile robot 100 to an operator of the autonomous mobile robot 100.

The autonomous mobile robot 100 includes a rigid member 140, also referred to as the post 140, connected to and extending generally vertically upward from the base 105. The post 140 supports a variety of peripheral components of the autonomous mobile robot 100, as will be described in more detail below. In the illustrated example, the post 140 is generally rectangular and defines therein a series of slots for receiving and/or connecting components. It is contemplated that the post 140 could be implemented in a variety of forms, including but not limited to a cylindrical form. It is also contemplated that more than one post could be included in the autonomous mobile robot 100, for example for supporting different peripheral components on different posts.

The autonomous mobile robot 100 further includes a system manager 180, also referred to as an embedded computer 180 or a controller 180, for managing operation of the autonomous mobile robot 100, the controller 180 being communicably connected to the navigation and mapping controller 112. The computer 180 has a processor unit (not shown) for carrying out executable code, and hard disk storage 150, also referred to as a memory unit 150, operatively connected to the controller 180 that stores, inter alia, the executable code in a non-transitory medium (not shown) included in the storage 150. The processor unit includes one or more processors for performing processing operations that implement functionality of the controller 180. The processor unit may be a general-purpose processor or may be a specific-purpose processor comprising one or more preprogrammed hardware or firmware elements (e.g., application-specific integrated circuits (ASICs), electrically erasable programmable read-only memories (EEPROMs), etc.) or other related elements. The non-transitory medium of the storage 150 may be a semiconductor memory (e.g., read-only memory (ROM) and/or random-access memory (RAM)), a magnetic storage medium, an optical storage medium, and/or any other suitable type of memory. Management of the autonomous mobile robot 100 according to methods of the present technology will be described in more detail below.

The autonomous mobile robot 100 includes a Wi-Fi antenna/router 155 communicatively and operatively connected to the controller 180. The Wi-Fi antenna/router 155 provides wireless communication between the autonomous mobile robot 100 (and/or the controller 180 of the autonomous mobile robot 100) and related systems, such as an external controller for an operator. Depending on the example, it is contemplated that the autonomous mobile robot 100 could communicate with a central controller via the Wi-Fi antenna/router 155.

In order to receive commands and provide information to a user in the data center 10, the autonomous mobile robot 100 includes a human-machine interface (HMI) 160. The HMI 160 is disposed on a top portion of the post 140. While the HMI 160 is arranged in a position to facilitate interaction by the user, it is contemplated that the HMI 160 could be differently placed on the post 140. The HMI 160 includes a touch screen 164 for presenting information to the user and for receiving touch commands from the user. In some examples, it is contemplated that the autonomous mobile robot 100 could receive commands only via wireless communication, including but not limited to the Wi-Fi antenna/router 155. In some such cases, the HMI 160 and/or the touchscreen 164.

Figure 7:
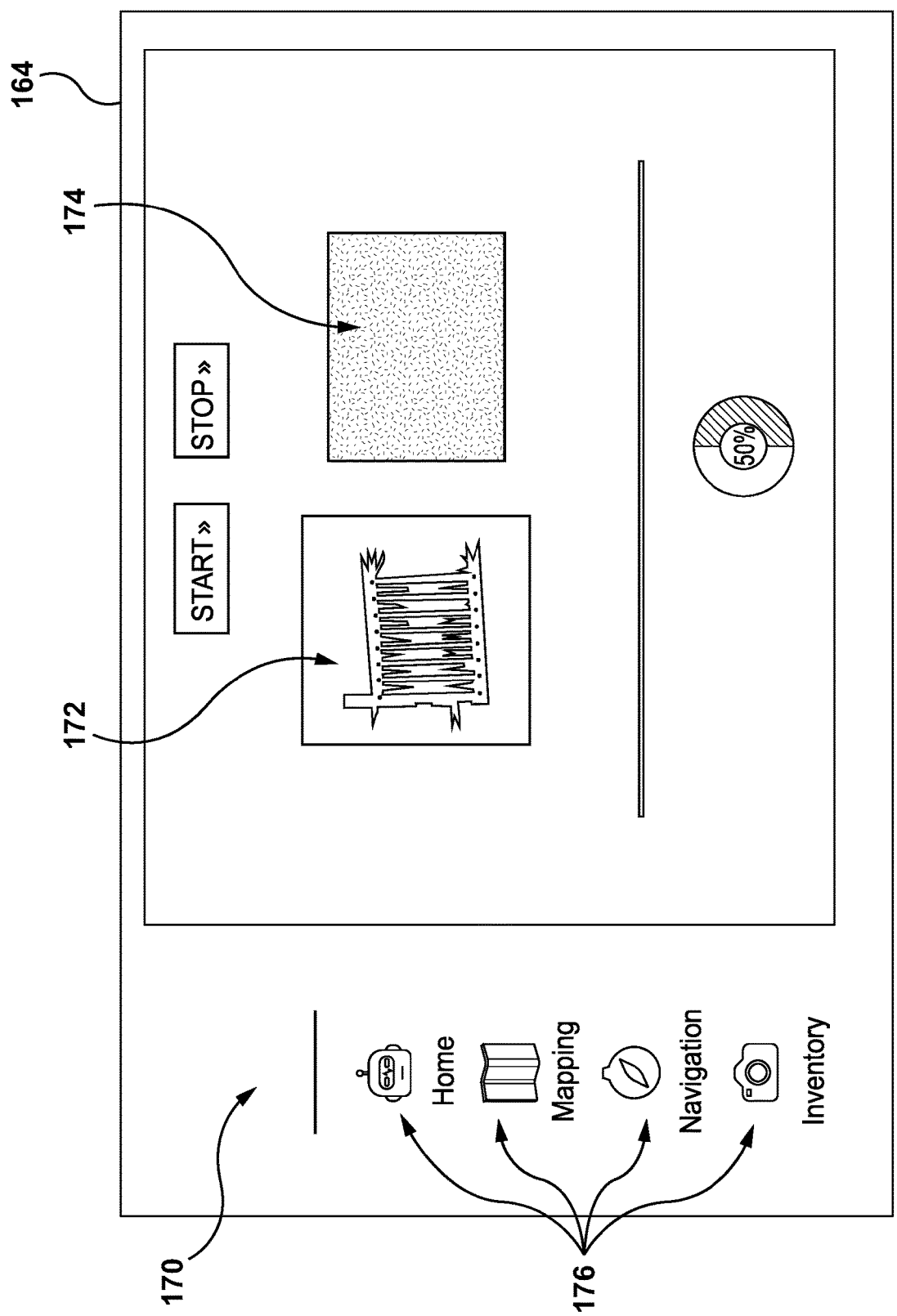
FIG. 7 is a non-limiting example of a graphic user interface (GUI) of a touchscreen of the autonomous mobile robot of FIG. 2.

FIG. 7 illustrates one non-limiting example of a control graphic user interface (GUI) 170 on the touch screen 164. The control GUI 170 is one non-limiting example of a software-implemented program for providing information to the user and providing an interface for receiving user commands. In the illustrated example, the control GUI 170 presents a computer-generated map 172 of the structure surveyed by the autonomous mobile robot 100, in this case the datacenter 10. The map 172 could be presented in a variety of forms, including but not limited to: an architectural plan and/or a theoretical map saved to the storage 150, and a map created and/or updated by the autonomous mobile robot 100 during exploration of the structure. The control GUI 170 also presents an image from the camera 124 (shown schematically) in order to illustrate the region in front of the autonomous mobile robot 100 to the user.

The control GUI 170, in the illustrated example, also includes a variety of control functions selectable via a plurality of icons 176. The control functions could vary depending on the particular example of the autonomous mobile robot 100 or needs of the structure surveyed thereby. The control functions could include, but are not limited to: a structure mapping function, a robot navigation function, an inventory activation function, and a structure monitoring function.

According to non-limiting examples, the controller 180, the control GUI 170, and components of the autonomous mobile robot 100 are operated using a robot operating system (ROS) according to a publisher/subscriber model. The controller 180 is communicatively connected to a plurality of nodes via the Wi-Fi antenna/router 155. In at least some examples, the controller 180 is implemented as a remote Next Unit of Computing module (NUC) communicably connected to the base 105. For example, the controller 180 may be remotely connected to the base 105 and components thereof using the Wi-Fi antenna/router 155 for transmitting signals. The controller 180 may also be communicably connected to the base 105 and components thereof using Ethernet protocol for transmitting signals. In different examples, different control programming is contemplated.

In this example, the autonomous mobile robot 100 further includes at least two cameras and an inventory module that, upon being executed by the controller 180, causes autonomous mobile robot 100 to take inventory of objects in the data center 10 based on data provided by the at least two cameras. The at least two cameras include a first camera 182 and a second camera 184. The cameras 182, 184 may be Red-Green-Blue (RGB) cameras, Red-Green-Blue-Depth (RGBD) cameras, monochromatic cameras, or any other types of cameras that may provide data suitable for being used by the inventoring module 174. The first camera 182 has a lower image resolution than the second camera 184 such that data provided by the first camera 182 may be manipulated by any data processing system (e.g. the controller 180) with less computing resources. Processing of the data provided by the first camera 182 may thus be substantially faster than processing of the data provided by the second camera 184. The data provided by the second camera 184 include more information about entities imaged by the second camera 184, given that an image resolution of the second camera 184 is substantially higher. For example and without limitation, the first image resolution is 640×480 (i.e. 640 pixels across a width of a picture capture by the first camera 184, and 480 pixels along a height of said picture) and the second image resolution is 4032×3040. The second image resolution is thus more than six times higher than the first image resolution. Execution of the inventoring module 174 is described in greater details here further below with respect to FIGS. 9 to 11.

The following description describes operation of the autonomous mobile robot 100 with a single first camera 182 and a single second camera 184. It should be noted that, in some examples, the autonomous mobile robot 100 may comprise a plurality of first cameras 182 and a plurality of second cameras 184. A plurality of point of views may thus be provided by the pluralities of cameras 182, 184. The plurality of first cameras 182 operate similarly to the described single first camera 182 and in a simultaneous manner with one another. The plurality of second cameras 184 operate similarly to the described single second camera 184 and in a simultaneous manner with one another. In some other examples, functions of the first and second cameras 182, 184 are performed by a unique camera that may selectively capture images at the first and second image resolutions. In an example, said unique camera is a RASPBERRY™ PI HQ camera having a 90° horizontal field of view (HFOV) lens.

Without specifically limiting the current technology, one example operating scheme for the autonomous mobile robot 100 is described herein. In one aspect, the autonomous mobile robot 100 takes inventory of a plurality of objects within a structure. In this example, the structure is the datacenter 10 and the plurality of objects is a plurality of servers housed in the racks 50 of the datacenter 10. It is contemplated that the structure and the plurality of objects may differ from the datacenter 10 and the servers thereof respectively in alternative examples. As such, any system variation configured to distribute perform any inventory of a plurality of object in a structure can be adapted to execute examples of the present technology, once teachings presented herein are appreciated.

Figure 8:
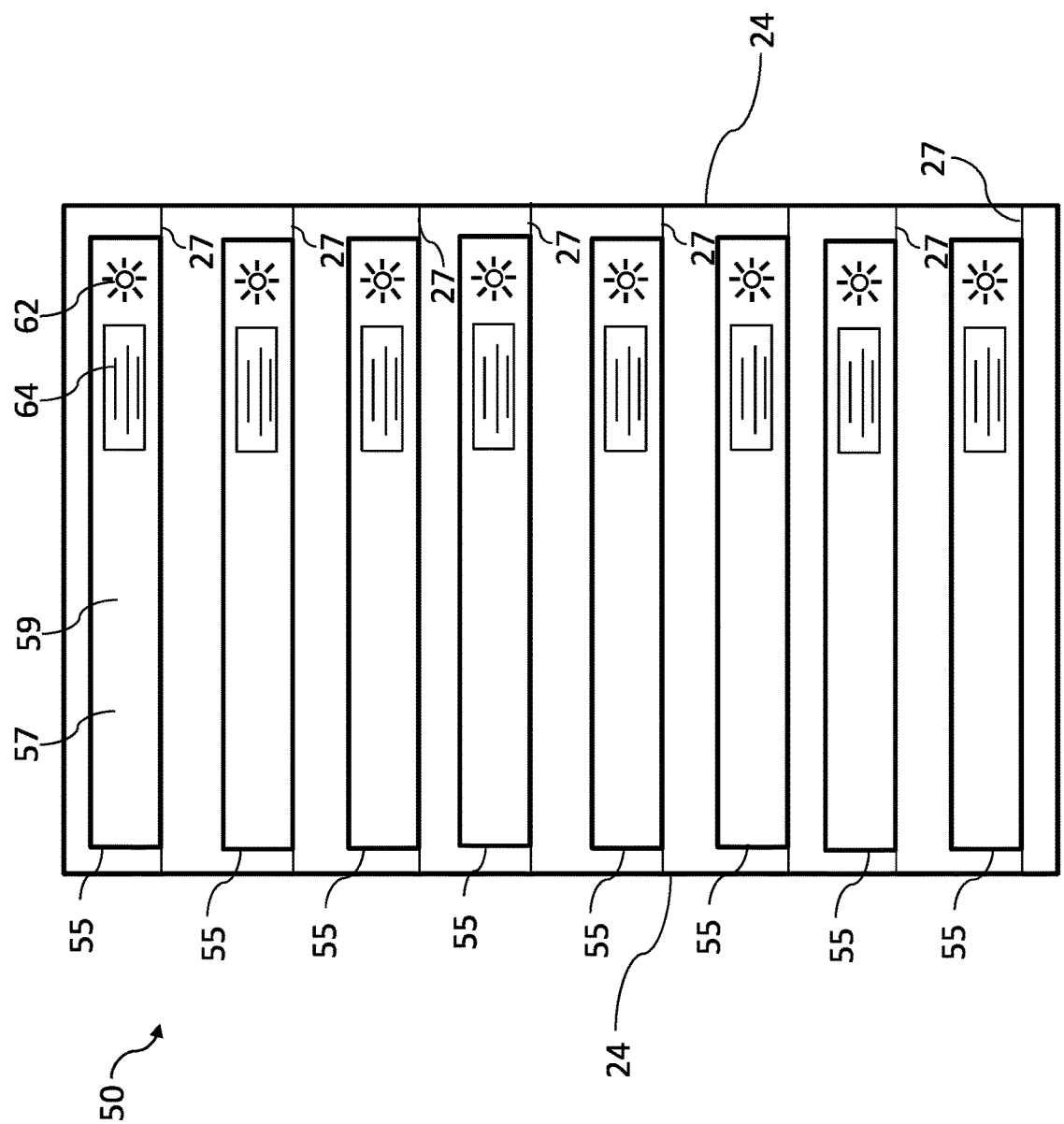
FIG. 8 schematically depicts a plurality of objects of a datacenter to be observed by the present technology.

FIG. 8 illustrates a plurality of objects of a datacenter to be observed by the present technology. More specifically, FIG. 8 depicts eight (8) electronic equipment modules 55 hosted in one of the racks 50 of the data center 10. It should be understood that the rack 50 may host a different number of electronic equipment modules 55 or other computer processing systems.

In this example, each electronic equipment module 55 includes a support unit 57 and electronic equipment such as a server or other electronic equipment (e.g., networking equipment) supported by the support unit 57. The support unit 57 may provide connecting means for connecting the electronic equipment module 55 to the rack 50. For example, the rack 50 may include vertical walls 24 laterally spaced from one another so as to define a housing section therebetween in which the electronic equipment modules 55 can be housed. The support unit 57 is connected to and/or supported by an equipment support 27. The equipment supports 27 are connected to each vertical wall 24 and extend perpendicular thereto. A mounting of the electronic equipment modules 55 within the rack 50 is not limitative, other means for connecting the electronic equipment modules 55 to the rack 50 are contemplated in alternative examples. In this example, the rack 50 may for example be a 19-inch, standard-size rack having dimensions as defined in the EIA/ECA-310-5 E "Cabinets, Racks, Panels, And Associated Equipment" standard.

In this example, the rack 50 is a server rack and the electronic equipment modules 55 housed thereby are server modules or related functional modules (e.g., networking or power supply modules). Broadly speaking, the electronic equipment modules 55 are disposed in the rack 50 in a same manner for each electronic equipment module 55 to form a column of similarly looking electronic equipment modules 55.

In this example, the support unit 57 of each electronic equipment module 55 includes a front panel 59. An indicator 62 is disposed on the front panel 59, which may be an electronic equipment module light (e.g., Light-Emitting Diode (LED)) for example, for indicating, when lit, that electronic components of the corresponding electronic equipment module 55 are electrically powered. Broadly speaking, the indicator 62 may be used to indicate presence and/or position of the electronic equipment module 55 in the rack 50. An inventory label 64 is also disposed on the front panel 59. The inventory label 64 may include texts, pictures, bar codes, QR-codes, or any other two-dimensional or three-dimensional indications comprising information about hardware characteristics, software characteristics and/or an identifier of the corresponding electronic equipment module 55. As such, any system suitable to read or scan the inventory label 64 may access said information about the corresponding electronic equipment module 55.

Figure 9:
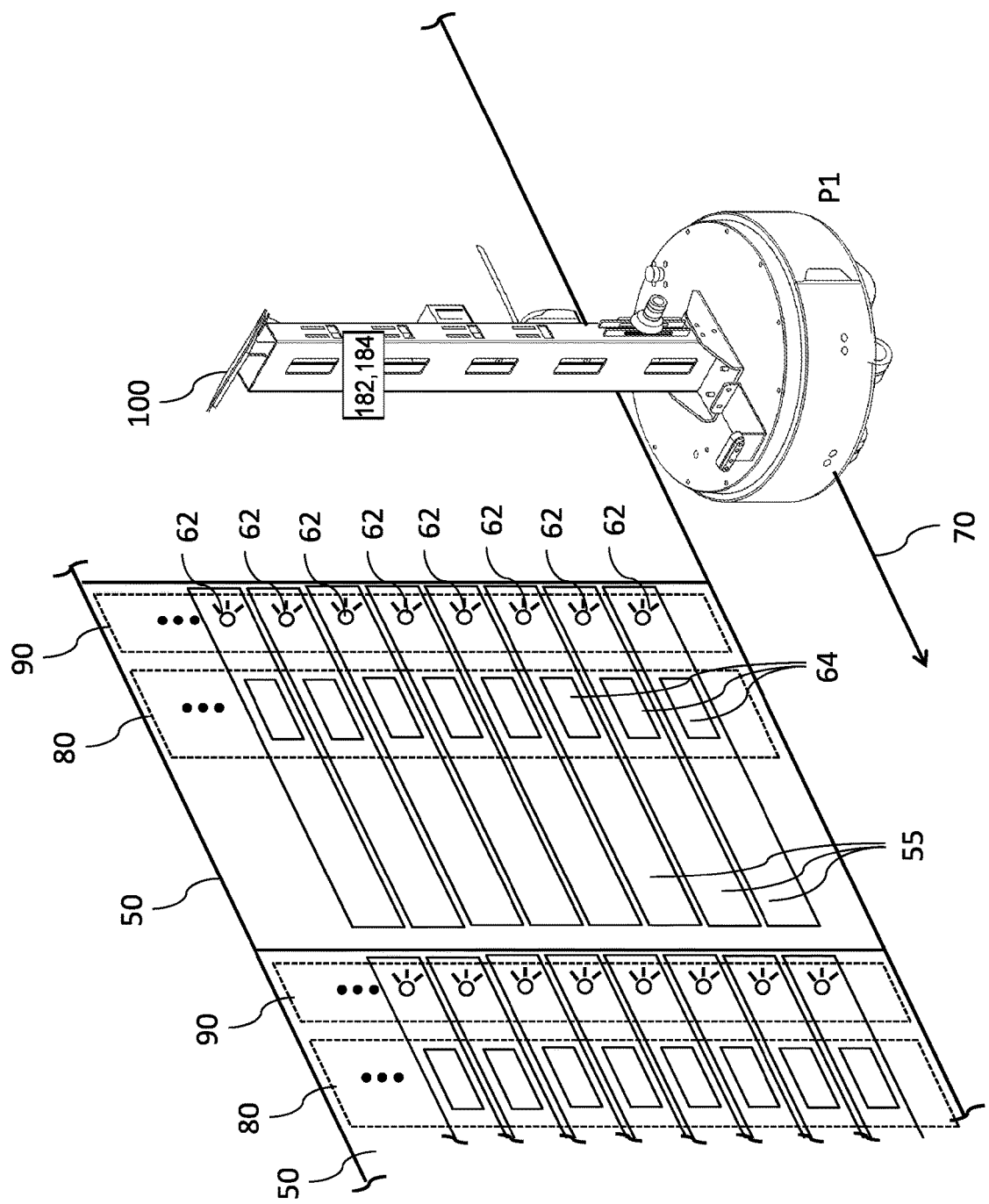
FIG. 9 schematically depicts the autonomous mobile taking inventory of the plurality of objects of FIG. 8.

FIG. 9 schematically depicts the autonomous mobile robot 100 taking inventory of the plurality of electronic equipment modules 55. As depicted on FIG. 9, the autonomous mobile robot 100 moves in a robot transport path 70 (e.g. an aisle of the data center 10) along a row of racks 50.

In this example, the controller 180 may use a navigation planner such as "move base" algorithm from Robot Operating System (ROS) software library to provide global and local planners to the autonomous mobile robot 100, coupled with "teb_local_planner" from the ROS software library that may optimize a trajectory of the autonomous mobile robot 100 with respect to a trajectory execution time, separation from detected obstacles and compliance with kinodynamic constraints at runtime. The navigation planner may thus plan navigation and further cause the autonomous mobile robot 100 to navigate along a generated path in the data center 10. During navigation, the autonomous mobile robot 100 uses sensors such as the inertial measurement unit (IMU) 116, the LIDAR assemblies 118, the ultrasonic sensors 120, the infrared sensors 114 and the camera 124 to receive environmental information about an environment of the autonomous mobile robot 100. For example, the LIDAR assemblies 118 may detect presence of the row of racks 50 and provide the controller 180 with data including information about a distance between said row of racks 50 and the autonomous mobile robot 100 such that the controller 180 may cause the autonomous mobile robot 100 to navigate at a given distance of the row of racks 50. This may increase a relative safety level of the autonomous mobile robot 100 and the racks 50 by reducing a probability of collision between the two. As another example, data provided by the camera 124 may be inputted in a object-detection algorithm to detect presence of a human entity (e.g., an operator of the data center), an open door of a rack 50, a forklift, or any other object that may be suitably detected by a given object-detection algorithm. Broadly speaking, the controller 180 is provided with the environmental information including information about entities present in a vicinity of the autonomous mobile robot 100 such that the controller 180 may cause and/or adjust a navigation thereof.

In this example, the controller 180 accesses a plan of the data center 10 and causes the autonomous mobile robot 100 to displace through the structure, displacements of the autonomous mobile robot 100 being based at least in part on the plan of the structure.

During navigation of the autonomous mobile robot 100, the controller 180 executes the inventoring module 174. More specifically, the controller 180 causes the first camera 182 to capture positioning images at the first image resolution. For example, the first camera 182 may continuously capture images (e.g., with an imaging rate of five images per second), the first camera 182 being oriented toward the racks 50. In some examples, the first camera provides a stream of images at the first image resolution to the controller 180. Images captured by the first camera 182 are indicative of a position of the autonomous mobile robot 100 relatively to the racks 50, as may thus be referred to as "positioning images". For example, and without limitations, the first camera 182 may be fixedly attached to the post 140, such that the first camera 182 is oriented toward the racks 50 when the autonomous mobile robot 100 navigates along the racks 50 on the robot transport path 70.

Upon receiving the positioning images, the controller 180 processes the positioning images and determine presence of a predetermined landmark, such as the indicator 62. The controller 180 may use a form-identifying image treatment algorithm to detect presence of the predetermined landmark in the positioning image. The image of the predetermined landmark may be, for example and without limitation, a shape, a contoured shape, a pattern, a color (e.g., RGB value, HSL value), a variation of color (e.g. gradient of color), a brightness and/or any visual characteristics or combination thereof of a pixel or a group of pixels of the captured positioning image.

In an example, the first camera 182 is an RGB camera and the controller 180 detects presence of the image of the predetermined landmark upon detecting a circular form having an RGB value within an RGB value range and a brightness value above a predetermined threshold. In this example, detection of the image of the predetermined landmark is indicative of an imaging, by the first camera 182, of one of the indicators 62 of the electronic equipment modules 55. Upon detecting the image of the predetermined landmark, the controller 180 identifies the positioning image containing the predetermined landmark as a landmarked positioning image.

With reference to FIG. 9, the autonomous mobile robot 100 is in a position denoted P1 while the first camera 182 captures images of the racks 50. For example, the controller 180 may identify a landmarked positioning image while the autonomous mobile robot 100 is positioned in P1.

In this example, the controller 180 uses the form-identifying image treatment algorithm to detect an image of a predetermined repeating landmark and identifies a positioning image as the landmarked positioning image in response to the predetermined repeating landmark being detected in said positioning image. For example, the indicators 62 of the electronic equipment module 55 of a same rack 50 form a column 90 of indicators, which can be referred to as a predetermined repeating landmark 90 given that it includes a plurality of the aforementioned predetermined landmarks. In other words, the form-identifying image treatment algorithm is used by the controller 180 to search for a predetermined repeating form pattern in the given positioning image. The positioning image is further identified as a landmarked positioning image in response to successfully finding the predetermined repeating form pattern in the given image.

In the same example, the first camera 182 is a RGB camera and the controller 180 detects presence of the image of the predetermined repeating landmark upon detecting a column of circular forms having an RGB value within an RGB value range and a brightness above a predetermined threshold. In other words, the predetermined repeating form pattern is a plurality of occurrences of circular forms having a RGB value within a RGB value range and a brightness value above a predetermined threshold in the positioning image, the circular forms being aligned along a same direction that is, in this example, a generally vertical line. In this example, detection of the image of the predetermined landmark is indicative of an imaging, by the first camera 182, of a column of the indicators 62 extending substantially vertically of the electronic equipment modules 55 of a same rack 50. Upon detecting the image of the predetermined repeating landmark, the controller 180 identifies the positioning image containing the predetermined repeating landmark as a landmarked positioning image.

Upon identifying a landmarked positioning image, the controller 180 may cause the autonomous mobile robot 100 to stop and determines a position of the autonomous mobile robot 100 relatively to the predetermined landmark. To do so, the controller 180 may, for example, use data provided by the IMU 116, the LIDAR assemblies 118, the ultrasonic sensors 120, the infrared sensors 114 and the camera 124. It is to be understood that in this context, the relative positions of the autonomous mobile robot 100 and the predetermined landmark include information about a location and an orientation of the autonomous mobile robot 100 relatively to the predetermined landmark and the rack 50.

The controller 180 further determines a data collection position relatively to the predetermined landmark or the predetermined repeating landmark. The data collection position and determination thereof are based on the position of the autonomous mobile robot 100 during acquisition of the landmarked positioning image (i.e., P1 in this example). Information about the data collection position relatively to the predetermined landmark or the predetermined repeating landmark may be accessed by the controller 180 such that the controller 180 may cause the autonomous mobile robot 100 to reach said data collection position starting from P1.

Figure 10:
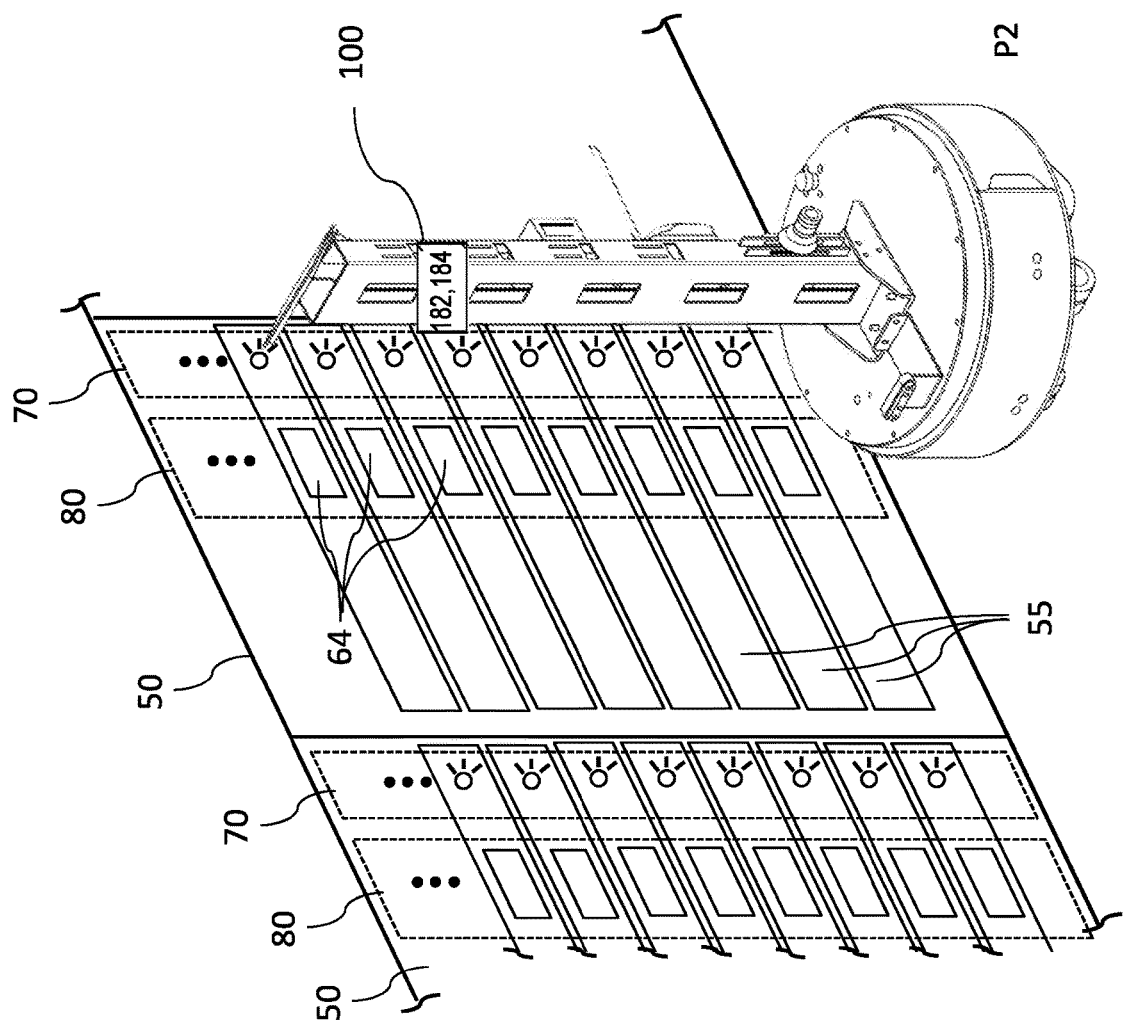
FIG. 10 illustrates a flow diagram showing operations of a method for taking inventory of a plurality of objects within a structure in accordance with non-limiting examples of the present technology.

For example, the controller 180 may determine that P1 is 2 meters away in a first direction from the predetermined landmark. The controller 180 may access information about the data collection position indicative that a location associated with the data collection position is 0.7 meter away from the predetermined landmark, and an orientation of the autonomous mobile robot 100 associated with the data collection position is a second predetermined direction. The controller 180 may thus determine the location and orientation of the data collection position relatively to P1 and cause the autonomous mobile robot 100 to reach said data collection position. It is to be understood that in this context, the autonomous mobile robot 100 is said to navigate to a predetermined data collection position in cases where a location and an orientation relative to the predetermine landmark are adjusted according to a predetermined location and angular orientation such that the autonomous mobile robot 100 is in the data collection position. In other word, upon identifying the landmarked positioning image and relative positions of the autonomous mobile robot 100 and the predetermined landmark or the predetermined repeating landmark, the controller 180 cause the autonomous mobile robot 100 to adjust a position (i.e. location and orientation of the autonomous mobile robot 100) by navigating to the data collection position. With reference to FIG. 10, the autonomous mobile robot 100 is in the data collection position denoted P2 and may have adjusted a location and/or an orientation of autonomous mobile robot 100 relatively to the predetermined landmark. In this example, the controller 180 causes the autonomous mobile robot 100 to stop once the autonomous mobile robot 100 is in the data collection position.

Once the autonomous mobile robot 100 is in the data collection position, the controller 180 cause the second camera 184 to acquire at least one inventory image at the second image resolution. In this example, the data collection position P2 is defined such that a field of view of the second camera 184 include the inventory labels 64 when the autonomous mobile robot 100 is in the data collection image P2. As shown on FIG. 10, the inventory labels 64 of the 55 of a same rack 50 form a label column 80. In this example, the field of view of the second camera 184 is set such that the inventory image includes the label column 80. The second camera 184 may be fixedly attached to the post 140 and adjacent to the first camera 182.

The controller 180 further extracts, from the inventory image, the plurality of inventory labels 64. The controller 180 may transmit the extracted inventory labels or data red or scanned therefrom to an operator device of an operator of the data center 10. The controller 180 may also access a database (e.g. using the Wi-Fi antenna/router 155) to access information about the electronic equipment modules 55 such as hardware characteristics, software characteristics and/or identifiers of the corresponding electronic equipment modules 55 based on the extracted inventory labels 64. Inventory of the electronic equipment modules 55 of a rack 50 may be performed. The autonomous mobile robot 100 may further proceed with navigating along the robot transport path 70 and take inventory of another rack 50.

It should be noted that the autonomous mobile robot 100 may successively take inventory of the electronic equipment modules 55 of consecutive racks 50 along the robot transport path 70. The autonomous mobile robot 100 may also receive instructions to navigate to a specific rack 50 within the data center 10 and take inventory of the electronic equipment modules 55 therefrom.

It should be noted that FIGS. 8 to 10 illustrates the autonomous mobile robot 100 operating in the data center 10 for taking inventory of electronic equipment modules 55 and more specifically, of servers within the data center 10. As such, any system variation configured to taking inventory of a plurality of objects within a structure can be adapted to execute examples of the present technology, once teachings presented herein are appreciated. Examples and embodiments of the present technology can be equally applied to other types of the structure and other types of objects to take inventory for. For example, the structure may be a warehouse, a mall, a shipping platform, a library, or any other structure where taking inventory may be suitably performed by the autonomous mobile robot 100. For example, the objects may be labelled items, shops, parcels, books, or any other objects that may be detected by the autonomous mobile robot 100.

Figure 11:
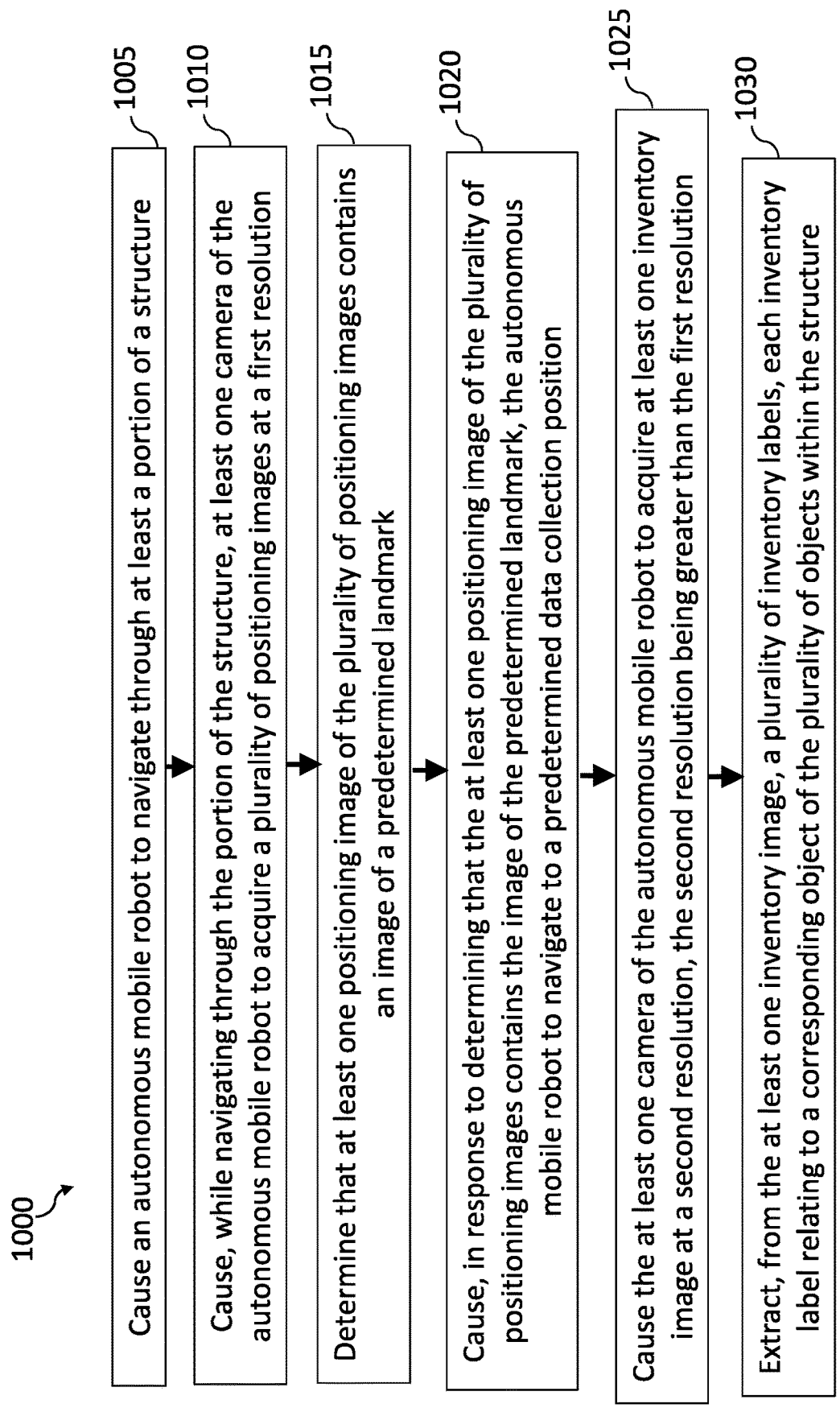
FIG. 11 is a block diagram of a controller in accordance with an example of the present technology.

FIG. 11 is a flow diagram of a method 1000 for taking inventory of a plurality of objects within a structure according to some examples of the present technology. In one or more aspects, the method 1000 or one or more steps thereof may be performed by an autonomous mobile robot, in the present example by the autonomous mobile robot 100. The method 1000 or one or more steps thereof may be, for example and without limitation, executed by the controller 180 or a remote controller communicably connected with the autonomous mobile robot 100. The method 1000 or one or more steps thereof may be embodied in computer-executable instructions that are stored in a computer-readable medium, such as a non-transitory mass storage device, loaded into memory and executed by a CPU. In this example, the steps of the method 1000 are executed by a controller of the autonomous mobile robot, such as controller 180 of the autonomous mobile robot 100. Some steps or portions of steps in the flow diagram may be omitted or changed in order.

The method 1000 begins, at step 1005, with causing the autonomous mobile robot to navigate through at least a portion of the structure. In an example, the structure is a data center such as the data center 10.

In one example, the controller of the autonomous mobile robot accesses a map or a plan of the structure and further causes the autonomous mobile robot to displace through the structure. The displacements of the autonomous mobile robot may be based at least in part on the plan of the structure. For example, the controller may use a navigation planner to determine the displacements of the autonomous mobile robot such as the aforementioned "move base" and "teb_local_planner" algorithms. The controller may also use the "map server" algorithm from the ROS software library to access and/or retrieve a map of the structure from a server or a database communicably connected to the controller.

In one example, the controller of the autonomous mobile robot may acquire environmental information using at least one sensor of the autonomous mobile robot. For example, the controller may communicate with sensors of the autonomous mobile robot such as the inertial measurement unit (IMU) 116, LIDAR assemblies 118, ultrasonic sensors 120, infrared sensors 114 and camera 124, and receive data therefrom. Said data may include navigational and environmental information. The controller may further base displacements of the autonomous mobile robot at least in part on the environmental information.

The method 1000 continues, at step 1010, with causing, while navigating through the portion of the structure, at least one camera of the autonomous mobile robot to acquire a plurality of positioning images at a first image resolution.

The at least one camera may be the first camera 182. The first image resolution may be, for example and without limitation, 640×480. In some examples, the at least one camera images at least one rack of the datacenter, such as the rack 50 to acquire the positioning images.

In an example, the autonomous mobile robot includes a plurality of cameras that may be identical to the first camera 182. The controller of the autonomous mobile robot causes the plurality of cameras to acquire a plurality of sets of positioning images. In this example, the plurality of cameras simultaneously image different areas of the structure. For example, the cameras may simultaneously image a front side of the rack 50 depicted on FIG. 8.

The method 1000 further continues, at step 1015, with determining that at least one positioning image of the plurality of positioning images contains an image of a predetermined landmark. The controller of the autonomous mobile robot may process a given image using a form-identifying image treatment algorithm to search for an image of the predetermined landmark for each positioning image. The form-identifying image treatment algorithm may be, for example and without limitation, YOLOv5 available on GitHub™ platform. Other algorithms may be used in addition to or instead of the YOLOv5 algorithm. For example, the controller may detect presence of the image of the predetermined landmark upon detecting a circular form having a RGB value within an RGB value range and a brightness value above a predetermined threshold in a given positioning image. The positioning image containing the image of the predetermined landmark may be referred to as a landmarked positioning image.

In this example, the controller may identify a positioning image as a landmarked positioning image upon determining presence of a predetermined repeating landmark in said positioning image. The controller of the autonomous mobile robot may use the form-identifying image treatment algorithm to search for a predetermined repeating form pattern in the given image for each of the plurality of positioning images. For example, the predetermined repeating form pattern may be a column of circular forms having a RGB value within a RGB value range and a brightness value above a predetermined threshold. In this example, the column of circular forms may correspond to the column 80 of indicators such as electronic equipment module light (e.g. LEDs) of the electronic equipment modules 55 of a same rack 50. In other words, the circular forms are expected to correspond to the indicators 62 (e.g., LEDs) as described in FIG. 8. In response to successfully finding the predetermined repeating form pattern, the controller identifies the given image as containing the image of the predetermined repeating landmark.

The method 1000 further continues, at step 1020, with causing, in response to determining that the at least one positioning image of the plurality of positioning images contains the image of the predetermined landmark, the autonomous mobile robot to reach a predetermined data collection position. More specifically, the controller may access information about a location and an orientation that the autonomous mobile robot should reach relatively to the predetermined landmark. Determination of the location of the predetermined data collection position relatively to a current location of the autonomous mobile robot is based at least in part on a position of the autonomous mobile robot during acquisition of the landmarked positioning image. In an example, the controller causes the autonomous mobile robot to come to a stop in an imaging position relative to the predetermined landmark.

The method 1000 further continues, at step 1025, with causing the at least one camera of the autonomous mobile robot to acquire at least one inventory image at a second image resolution, the second image resolution being greater than the first image resolution. The second image resolution may be, for example and without limitation, 4032×3040.

It should be noted that, in this example, the autonomous mobile robot includes a first camera (e.g., the first camera 124) to acquire images at the first image resolution and a second camera (e.g. the second camera 184) to acquire images at the second image resolution. Data provided by the first camera may thus be manipulated by any data processing system (e.g., the controller 180) with less computing resources compared to data provided by the second camera. Processing of the data provided by the first camera may thus be substantially faster than processing of the data provided by the second camera. On the other hand, data provided by the second camera include more information due to the relative higher image resolution.

In this example, acquiring the inventory images includes imaging inventory labels, such as the inventory labels 64, disposed on a front surface of the electronic equipment modules 55. More specifically, it is expected that the inventory labels are included in a field of view of the second camera when the autonomous mobile robot is in the data collection position.

In an example, the controller of the autonomous mobile robot causes the at least one camera to acquire the plurality of positioning images at the first image resolution and the at least one inventory image at the second image resolution at a same distance to the plurality of objects.

The method 1000 ends, at step 1030, with extracting from the at least one inventory image, a plurality of inventory labels, each inventory label relating to a corresponding object of the plurality of objects within the structure. The inventory labels may be, for example and without limitation, similar or having the same characteristics to the inventory labels 64 of the electronic equipment modules 55. As such, the controller may extract texts, pictures, bar codes, QR-codes, or any other two-dimensional or three-dimensional indications of the inventory labels comprising information about hardware characteristics, software characteristics and/or an identifier of the corresponding electronic equipment module 55.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It is to be understood that the operations and functionality of the described autonomous mobile robot 100, its constituent components, and associated processes may be achieved by any one or more of hardware-based, software-based, and firmware-based elements such as a plurality of autonomous mobile robots similar to the autonomous mobile robot 100 operating in parallel. Such operational alternatives do not, in any way, limit the scope of the present disclosure.

It should be expressly understood that not all technical effects mentioned herein need to be enjoyed in each and every example or embodiment of the present technology.

Modifications and improvements to the above-described embodiments and examples of the present technology may become apparent to those skilled in the art. The foregoing description is intended to be exemplary rather than limiting.

The scope of the present technology is therefore intended to be limited solely by the scope of the appended claims.

What is claimed is:

1. A method for taking inventory of a plurality of objects within a datacenter, the method comprising:
   causing the autonomous mobile robot to navigate through at least a portion of the datacenter;
   while navigating through the portion of the datacenter, causing at least one camera of the autonomous mobile robot to acquire a plurality of positioning images of at least one rack of the datacenter at a first image resolution;
   determining that at least one positioning image of the plurality of positioning images contains an image of a predetermined landmark, wherein the predetermined landmark is a plurality of electronic equipment module lights of the at least one rack;
   in response to determining that the at least one positioning image of the plurality of positioning images contains the image of the predetermined landmark, causing the autonomous mobile robot to navigate to a predetermined data collection position, the predetermined data collection position being based at least in part on a position of the autonomous mobile robot during acquisition of the at least one positioning image;
   causing the at least one camera of the autonomous mobile robot to acquire at least one inventory image at a second image resolution in the predetermined data collection position, the second image resolution being greater than the first image resolution; and
   extracting, from the at least one inventory image, a plurality of inventory labels, each inventory label relating to a corresponding object of the plurality of objects within the datacenter, wherein extracting the plurality of inventory labels further comprises extracting a corresponding inventory label identifying a corresponding electronic equipment module of the at least one rack.

2. The method of claim 1, wherein causing the autonomous mobile robot to navigate to the predetermined data collection position comprises: causing the robot to come to a stop in an imaging position relative to the predetermined landmark.

3. The method of claim 1, wherein causing the autonomous mobile robot to navigate through at least the portion of the datacenter comprises: accessing a plan of the datacenter; and causing the autonomous mobile robot to displace through the datacenter, displacements of the autonomous mobile robot being based at least in part on the plan of the datacenter.

4. The method of claim 3, wherein causing the autonomous mobile robot to displace through the datacenter further comprises acquiring environmental information using at least one sensor of the autonomous mobile robot, displacements of the autonomous mobile robot being based at least in part on the environmental information.

5. The method of claim 1, wherein determining that the at least one positioning image contains an image of the predetermined landmark comprises determining that the at least one positioning image contains an image of a predetermined repeating landmark.

6. The method of claim 5, wherein determining that the at least one positioning image contains the image of the predetermined repeating landmark comprises:
   for each of the plurality of positioning images, processing a given image using a form-identifying image treatment algorithm to search for a predetermined repeating form pattern in the given image; and
   in response to successfully finding the predetermined repeating form pattern in the given image, identifying the given image as containing the image of the predetermined repeating landmark.

7. The method of claim 6, wherein:
processing the given image using the form-identifying image treatment algorithm comprises:
   identifying a plurality of circular forms of a predetermined color value within the given image; and
   in response to the plurality of circular forms forming a generally vertical line, identifying the given image as containing the image of the predetermined repeating landmark.

8. The method of claim 1, wherein:
causing the at least one camera to acquire the plurality of positioning images at the first image resolution comprises:
   causing a plurality of cameras of the autonomous mobile robot to acquire a plurality of sets of positioning images, the plurality of cameras being configured and arranged to simultaneously image different areas of the datacenter.

9. The method of claim 1, wherein causing the at least one camera of the autonomous mobile robot to acquire the plurality of positioning images at the first image resolution and causing the at least one camera to acquire the at least one inventory image at the second image resolution occurs with the at least one camera in a same distance to the plurality of objects.

10. A non-transitory computer-readable medium comprising computer-readable instructions that, upon being executed by a system, cause the system to perform the method of claim 1.

11. An autonomous mobile robot for taking inventory in a datacenter, the autonomous mobile robot comprising:
   a mobile robot base for providing movement of the autonomous mobile robot;
   a rigid member connected to and at least partially extending upward from the mobile robot base;
   at least one camera immovably connected to the rigid member, the at least one camera being configured and arranged to acquire images of a plurality of objects within in the datacenter; and
   a controller system communicatively connected to the mobile robot base and the at least one camera, the controller system being configured to:
   control displacement of the autonomous mobile robot using the mobile robot base causing the autonomous mobile robot to navigate to a predetermined data collection position,
   control operation of the at least one camera to:
      acquire a plurality of positioning images of at least one rack of the datacenter at a first image resolution; and
      acquire, in response to determining that the at least one positioning image of the plurality of positioning images contains an image of a predetermined landmark and at the predetermined data collection position, at least one inventory image at a second image resolution, the second image resolution being greater than the first image resolution, wherein the predetermined data collection position is based at least in part on a position of the autonomous mobile robot during acquisition of the at least one positioning image, and wherein the predetermined landmark is a plurality of electronic equipment module lights of the at least one rack; and extract, from the at least one inventory image, a plurality of inventory labels, each inventory label relating to a corresponding object of the plurality of objects within the datacenter, wherein extracting the plurality of inventory labels further comprises extracting a corresponding inventory label identifying a corresponding electronic equipment module of the at least one rack.

12. The autonomous mobile robot of claim 11, wherein:

the at least one camera comprises a plurality of cameras connected to the rigid member; and each camera of the plurality of cameras is configured and arranged to simultaneously image a different portion of the datacenter.

13. The autonomous mobile robot of claim 12, at least one camera of the plurality of cameras is vertically spaced from at least one other camera of the plurality of cameras.

* * * * *